US008060278B2

(12) United States Patent
Bolio et al.

(10) Patent No.: US 8,060,278 B2
(45) Date of Patent: Nov. 15, 2011

(54) METHODS AND SYSTEMS FOR CONTROLLING STEERING IN A VEHICLE USING A PRIMARY ACTIVE STEERING FUNCTIONALITY AND A SUPPLEMENTAL ACTIVE STEERING FUNCTIONALITY

(75) Inventors: Robert R. Bolio, Clarkston, MI (US); Ross Feller, Ann Arbor, MI (US); Kerfegar K. Katrak, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1015 days.

(21) Appl. No.: 11/872,185

(22) Filed: Oct. 15, 2007

(65) Prior Publication Data

US 2009/0099729 A1  Apr. 16, 2009

(51) Int. Cl.
*B62D 6/00* (2006.01)

(52) U.S. Cl. .......... 701/41; 180/421; 180/446; 180/443; 180/444

(58) Field of Classification Search .............. 701/41; 180/401, 446, 422, 421, 443, 444; 318/432; B62D 6/00
See application file for complete search history.

(56) References Cited

U.S. PATENT DOCUMENTS

| 5,457,632 A * | 10/1995 | Tagawa et al. ................. 701/43 |
| 5,561,603 A * | 10/1996 | Goto ............................. 701/41 |
| 6,470,994 B1 * | 10/2002 | Shimizu et al. ............... 180/446 |
| 7,885,742 B2 * | 2/2011 | Yamazaki ...................... 701/41 |
| 2002/0092696 A1 * | 7/2002 | Bohner et al. ............... 180/405 |
| 2002/0092700 A1 * | 7/2002 | Kim et al. ..................... 180/446 |
| 2002/0198644 A1 * | 12/2002 | Obata et al. .................... 701/41 |
| 2003/0098197 A1 * | 5/2003 | Laurent et al. ............... 180/401 |
| 2004/0064221 A1 * | 4/2004 | DePrez et al. ................... 701/2 |
| 2005/0115753 A1 * | 6/2005 | Pemberton et al. ........... 180/167 |
| 2005/0121252 A1 * | 6/2005 | Tsuchiya ...................... 180/446 |
| 2006/0042859 A1 * | 3/2006 | Itoh .............................. 180/402 |
| 2006/0090952 A1 * | 5/2006 | Ito ................................ 180/446 |
| 2007/0227806 A1 * | 10/2007 | Wei .............................. 180/446 |

* cited by examiner

*Primary Examiner* — Tuan C. To
(74) *Attorney, Agent, or Firm* — Ingrassia Fisher & Lorenz P.C.

(57) ABSTRACT

A method for controlling steering in a vehicle includes the steps of obtaining a vehicle steering communication, controlling an actuator coupled to a hand wheel, a road wheel, or both using a primary active steering functionality, if the vehicle steering communication reflects one or more of a plurality of types of specified errors, and controlling the actuator using the primary active steering functionality and a supplemental active steering functionality, if the vehicle steering communication does not reflect one or more of the plurality of types of specified errors.

20 Claims, 3 Drawing Sheets

METHODS AND SYSTEMS FOR CONTROLLING STEERING IN A VEHICLE USING A PRIMARY ACTIVE STEERING FUNCTIONALITY AND A SUPPLEMENTAL ACTIVE STEERING FUNCTIONALITY

TECHNICAL FIELD

The present invention generally relates to the field of vehicles and, more specifically, to methods and systems for controlling steering in a vehicle.

BACKGROUND OF THE INVENTION

Vehicle steering is generally controlled by a driver hand wheel that directs the angle of road wheels. Movements of the driver hand wheel are typically transmitted to the road wheels by mechanical linkages and/or electronic components. The angle of the road wheels is commonly referred to as "road wheel angle".

Active steering is a term referring to the use of electronic components to actively control or assist the steering of a vehicle so as to enhance steering performance beyond that possible by only direct mechanical linkages. There are many possible ways to enhance steering performance. For example, steering can be adapted to the weather conditions and/or to the behavior and/or habits of the driver. As another example, steering can be adapted to provide improved directional control during braking.

Open loop control refers to the operation of a road wheel angle controller, without feedback, that is independent of any supervisory control system. For example, in an active steering system, variable gear ratio steering is a method for determining a target road wheel angle implied by a driver's hand wheel input. Such variable gear ratio active steering functionality typically uses variables such as a steering wheel angle, a steering wheel angle rate, and a speed of the vehicle to determine the target road wheel angle implied by a driver's hand wheel input. The active steering system may use variable gear ratio active steering functionality to ascertain the target road wheel angle for open loop control. The active steering system may then use an actuator to rotate the front road wheels for a given road wheel angle.

Closed loop control or electronic closed loop control refers to the operation of a road wheel angle controller with feedback from a supervisory control system. For closed loop control, an angle offset from a supervisory control system is added to the variable gear ratio steering angle to determine a target road wheel angle that should be implemented by the steering mechanism. For example, the active steering system may include an electronic stability control functionality that determines such an angle offset when the vehicle is in a skid, or when conditions otherwise warrant electronic stability control. The active steering system may then similarly use an actuator to rotate the front road wheels for a given road wheel angle adjustment.

Often, an active steering system will use a primary active steering functionality (such as an open loop, variable gear ratio functionality as described above) along with a supplemental active steering functionality (such as a closed loop, electronic stability control functionality as described above). The primary and supplemental active steering functionalities generally work well together. However, in certain situations it may be necessary to discontinue use of the supplemental active steering functionality. When this occurs, typically the actuator is locked, in order to bypass the supplemental active steering functionality. However, this also has the effect of bypassing the primary active steering functionality, which may still be desirable to have operating.

Accordingly, there is a need for an improved method for bypassing a supplemental active steering functionality, without bypassing a primary active steering functionality, in appropriate circumstances. There is also a need for an improved active steering system that is configured to bypass a supplemental active steering functionality, without bypassing a primary active steering functionality, in appropriate circumstances. There is a further need for an improved program product for an active steering system that is configured to bypass a supplemental active steering functionality, without bypassing a primary active steering functionality, in appropriate circumstances. Furthermore, other desirable features and characteristics of the present invention will be apparent from the subsequent detailed description and the appended claims, taken in conjunction with the accompanying drawings and the foregoing technical field and background.

SUMMARY OF THE INVENTION

In accordance with an exemplary embodiment of the present invention, a method for controlling steering in a vehicle is provided. The method comprises the steps of obtaining a vehicle steering communication, controlling an actuator coupled to a hand wheel, a road wheel, or both, using a primary active steering functionality, if the vehicle steering communication reflects one or more of a plurality of types of specified errors, and controlling the actuator using the primary active steering functionality and a supplemental active steering functionality, if the vehicle steering communication does not reflect one or more of the plurality of types of specified errors.

In accordance with another exemplary embodiment of the present invention, a program product for controlling steering in a vehicle is provided. The program product comprises a program and a computer-readable signal-bearing media. The program is configured to at least facilitate obtaining a vehicle steering communication, controlling an actuator coupled to a hand wheel, a steering wheel, or both using a primary active steering functionality, if the vehicle steering communication reflects one or more of a plurality of types of specified errors, and controlling the actuator using the primary active steering functionality and a supplemental active steering functionality, if the vehicle steering communication does not reflect one or more of the plurality of types of specified errors. The computer-readable signal bearing media bears the program.

In accordance with a further exemplary embodiment of the present invention, an active steering system for a vehicle is provided. The active steering system comprises a supervisory control module and an active steering control module. The active steering control module is coupled to the supervisory control module, and is configured to receive a vehicle steering communication therefrom. The active steering control module is further configured to at least facilitate controlling a hand wheel, a road wheel, or both, using a primary active steering functionality, if the vehicle steering communication reflects one or more of a plurality of types of specified errors, and controlling the hand wheel, the road wheel, or both, using the primary active steering functionality and a supplemental active steering functionality, if the vehicle steering communication does not reflect one or more of the plurality of types of specified errors.

DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of steering control systems, and that the vehicle system described herein is merely one example embodiment of the invention.

For the sake of brevity, conventional techniques related to signal processing, data transmission, signaling, actuator control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Figure 1:
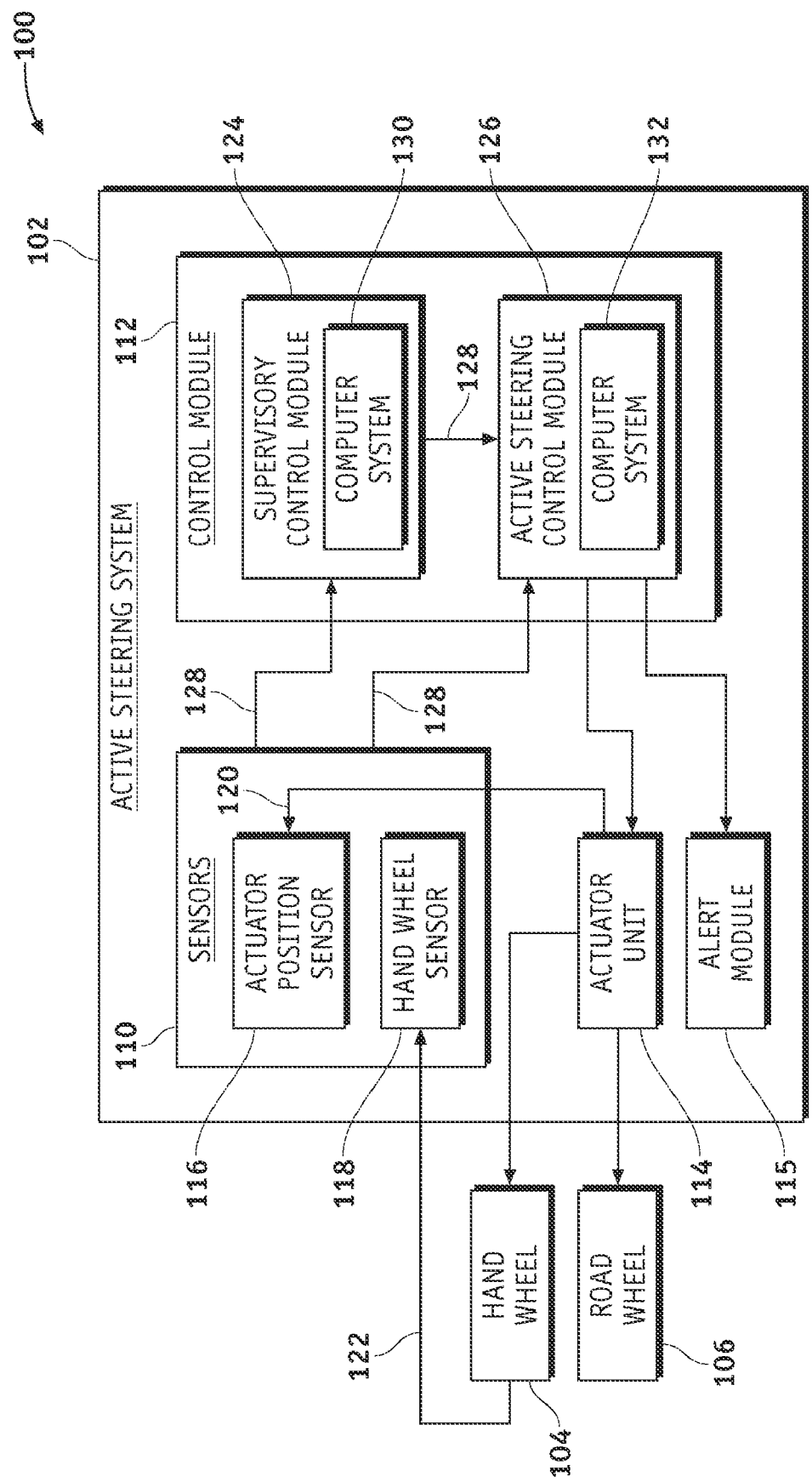
FIG. 1 is a functional block diagram of a portion of a vehicle, including an active steering system, in accordance with an exemplary embodiment of the present invention.

FIG. 1 is a functional block diagram of a portion of a vehicle 100, including an active steering system 102, in accordance with an exemplary embodiment of the present invention. The active steering system 102 is depicted in FIG. 1 along with a hand wheel 104 and an exemplary road wheel 106 from a plurality of road wheels 106 of the vehicle 100. The various blocks depicted in FIG. 1 may be realized in any number of physical components or modules located throughout the vehicle 100 or the active steering system 102. For example, in various embodiments, the active steering system 102 may include a number of electrical control units, computer systems, and components other than those shown in FIG. 1. In one preferred embodiment, the active steering system 102 comprises a front active steering (AFS) system for the vehicle 100.

In the depicted embodiment, the active steering system 102 includes a plurality of sensors 110, a control module 112, an actuator unit 114, and an alert module 115. Also in the depicted embodiment, the sensors 110 include an actuator position sensor 116 and a hand wheel sensor 118. The actuator position sensor 116 receives a first input 120 from the actuator unit 114, and the hand wheel sensor 118 receives a second input 122 from the hand wheel 104. In a preferred embodiment, the first input 120 includes information pertaining to a position of the actuator unit 114, or other information pertaining to the actuator unit 114, which can then be utilized in determining a road wheel angle. Similarly, in a preferred embodiment, the second input 122 includes information pertaining to an angle or position of the hand wheel 104, or other information pertaining to the hand wheel 104. In a preferred embodiment, a road wheel angle can be determined utilizing information from both the actuator position sensor 116 and the hand wheel sensor 118, obtained via the first and second inputs 120, 122, respectively. In certain embodiments, the sensors 110 may include other sensors, such as a pinion sensor (not depicted), and/or any number of other various different types of sensors.

As depicted in FIG. 1, the control module 112 is coupled to the sensors 110 via a vehicle communications bus 128, and receives information therefrom. The control module 112 is also coupled to the actuator unit 114 and to the alert module 115. The control module 112 is configured to determine an appropriate steering angle and/or steering angle adjustment based at least in part on the information obtained from the sensors 110, and to cause the actuator unit 114 to rotate and/or otherwise adjust the hand wheel 104 and/or the road wheel 106 in order to implement the appropriate steering angle and/or steering angle adjustment. In addition, the control module may also receive and process information from other vehicle modules (not depicted in FIG. 1). The actuator unit 114 comprises one or more actuators that are coupled between the control module 112 and the hand wheel 104 and/or the road wheel 106, and that are configured to rotate and/or otherwise facilitate adjustment of angles and/or other positions of the hand wheel 104 and/or the road wheel 106 in accordance with instructions provided by the control module 112.

In the depicted embodiment, the control module 112 includes a supervisory control module 124 and an active steering control module 126 that are connected to one another via the vehicle communications bus 128. The supervisory control module 124 processes a steering angle adjustment in certain situations using a supplemental active steering functionality and the information provided by the sensors 110, and supplies various steering communications pertaining thereto to the active steering control module 126. For example, in one preferred embodiment, the supervisory control module 124 processes the information from the sensors 110 (and from any other non-depicted vehicle modules that may supply information thereto) in order to calculate a steering angle adjustment using a supplemental, closed loop, electronic stability control active steering functionality when the vehicle is in a skid or when conditions otherwise warrant electronic stability control. In this embodiment, the steering angle adjustment refers to an adjustment to a steering angle intended by the driver, and instructions for this steering angle adjustment are provided from the supervisory control module 124 to the active steering control module 126 via various steering communication messages sent from the supervisory control module 124 to the active steering control module 126 along the vehicle communications bus 128.

The active steering control module 126 receives the steering communication messages from the supervisory control module 124, and preferably also receives information directly from the sensors 110 regarding the position of the hand wheel 104 and the road wheel 106. The active steering control module 126 processes the information from the sensors 110 in calculating a driver intended steering angle using a primary active steering functionality. For example, in a preferred embodiment, the active steering control module 126 calculates the driver intended steering angle using a primary, open loop, variable gear ratio active steering functionality that is provided variables such as a steering wheel angle, a steering wheel angle rate, and a speed of the vehicle obtained from the sensors 110 and/or from other vehicle modules (not depicted in FIG. 1), and, for example, using look-up tables or other techniques relating such input variables to desired steering angles.

In addition, in this embodiment, the active steering control module 126, under appropriate circumstances, adjusts the steering angle by the steering angle adjustment determined by the supervisory control module 124. In a preferred embodiment, the active steering control module makes such an adjustment to the steering angle only if the supervisory control module 124 provides a non-zero value for the steering angle adjustment in a steering communication message to the active steering control module 126 (e.g. indicating the presence of a skid or another factor for which electronic stability control may be appropriate), and further provided that there is no error reflected in the steering communications.

The active steering control module 126 then causes the actuator unit 114 to rotate the hand wheel 104 or the road wheel 106, or both, in order to achieve the appropriate steering angle. This appropriate steering angle reflects the driver intended steering angle, as determined in accordance with the primary active steering functionality. In addition, this appropriate steering angle also reflects the steering angle adjustment, if any, calculated using the supplemental active steering functionality, provided that there are no errors of a specified type in steering communications between the supervisory control module 124 and the active steering control module 126.

In addition, as will be explained in greater detail further below in connection with FIG. 3, the active steering control module 126 utilizes the primary active steering functionality in different modes, depending on whether there is an error of a specified type in steering communications between the supervisory control module 124 and the active steering control module 126. If there are no such errors in steering communications between the supervisory control module 124 and the active steering control module 126, then the active steering control module 126 utilizes the primary active steering functionality in a standard mode, for example using standard mode look-up tables relating the input variables to desired steering angles.

Conversely, if there are any such errors in steering communications between the supervisory control module 124 and the active steering control module 126, then the active steering control module 126 utilizes the primary active steering functionality and bypasses the supplemental active steering functionality. A description of the various errors that may trigger the bypassing of the supplemental active steering functionality will be provided further below in connection with FIG. 4, in accordance with an exemplary embodiment of the present invention. For example, such errors may be manifested in an absence of a particular steering communication, an absence of a steering adjustment value in the steering communications, or the presence of an invalid or an out-of-range value for a steering adjustment value in the steering communications, as will be discussed further below in connection with FIG. 4.

In one embodiment, in the event that supplemental active steering functionality is bypassed, the primary active steering functionality is used in a secure mode, for example using alternative "secure mode" look-up tables relating the input variables to desired steering angles. In a preferred embodiment, steering in the secure mode offers less sensitive steering than the standard mode, because the backup functionality provided by the supplemental active steering is not being utilized.

In addition, in a preferred embodiment, in the event of such an error in steering communications between the supervisory control module 124 and the active steering control module 126, the active steering control module 126 also causes the alert module 115 to issue one or more driver alerts, such as a visual and/or an audio notice, indicating that the primary vehicle functionality is being utilized in connection with the secure mode. For example, in one preferred embodiment, the alert module 115 provides a chime sound along with a visual notice on a vehicle screen display when the primary active steering functionality is being utilized in the secure mode, to make the driver aware that active front steer capability of the vehicle has been altered or changed in secure mode.

Also as depicted in FIG. 1, preferably the supervisory control module 124 and the active steering control module 126 each utilize one or more computer systems 130, 132, such as that depicted in FIG. 2 and discussed below in connection therewith. In the depicted embodiment, the supervisory control module 124 and the active steering control module 126 use different computer systems 130, 132. However, it will be appreciated that, in various other embodiments, the supervisory control module 124 and the active steering control module 126 may use one or more common computer systems. It will similarly be appreciated that, in various embodiments, the control module 112, and/or the various modules thereof, may use any number of different types of computer systems.

Figure 2:
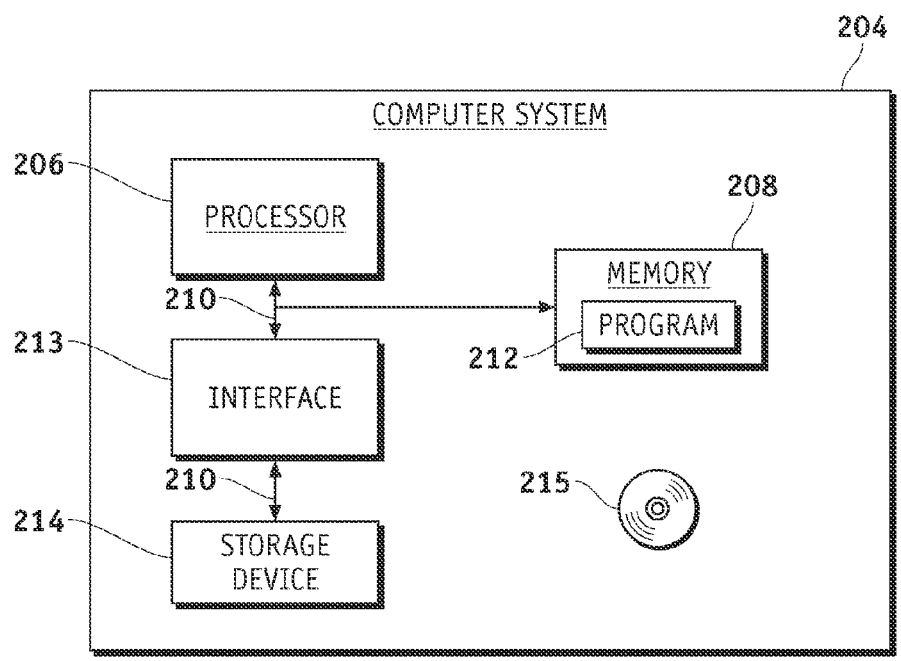
FIG. 2 is a functional block diagram of a computer system that can be used in connection with an active steering system, such as the active steering system of FIG. 1, in accordance with an exemplary embodiment of the present invention.

FIG. 2 is a functional block diagram of a computer system 204 that can be used in connection with the control module 112 of the active steering system 102 of FIG. 1, in accordance with an exemplary embodiment of the present invention. In one preferred embodiment, each of the supervisory control module 124 and the active steering control module 126 uses a different computer system 204. However, similar to the discussion above, this may vary in other embodiments.

In the embodiment depicted in FIG. 2, each computer system 204 includes a processor 206, a memory 208, a computer bus 210, an interface 213, and a storage device 214. The processor 206 performs the computation and control functions of the control module 112 or a portion thereof, and may comprise any type of processor or multiple processors, single integrated circuits such as a microprocessor, or any suitable number of integrated circuit devices and/or circuit boards working in cooperation to accomplish the functions of a processing unit. During operation, the processor 206 executes one or more programs 212 preferably stored within the memory 208 and, as such, controls the general operation of the computer system 204.

The memory 208 stores a program or programs 212 that executes one or more embodiments of a steering control process of the present invention, discussed in more detail below. The memory 208 can be any type of suitable memory. This would include the various types of dynamic random access memory (DRAM) such as SDRAM, the various types of static RAM (SRAM), and the various types of non-volatile memory (PROM, EPROM, and flash). It should be understood that the memory 208 may be a single type of memory component, or it may be composed of many different types of memory components. In addition, the memory 208 and the processor 206 may be distributed across several different computers that collectively comprise the computer system 204. For example, a portion of the memory 208 may reside on a computer within a particular apparatus or process, and another portion may reside on a remote computer.

The computer bus 210 serves to transmit programs, data, status and other information or signals between the various components of the computer system 204. The computer bus 210 can be any suitable physical or logical means of connecting computer systems and components. This includes, but is not limited to, direct hard-wired connections, fiber optics, infrared and wireless bus technologies.

The interface 213 allows communication to the computer system 204, for example from a system operator and/or another computer system, and can be implemented using any suitable method and apparatus. It can include one or more network interfaces to communicate to other systems or components, for example between the supervisory control module 124 and the active steering control module 126, and/or between the control module 112 and the sensors 110, the actuator unit 114, and/or the alert module 115, one or more terminal interfaces to communicate with technicians, and one or more storage interfaces to connect to storage apparatuses such as the storage device 214.

The storage device 214 can be any suitable type of storage apparatus, including direct access storage devices such as hard disk drives, flash systems, floppy disk drives and optical disk drives. In one exemplary embodiment, the storage device 214 is a program product from which memory 208 can receive a program 212 that executes one or more embodiments of a steering control process of the present invention. In one preferred embodiment, such a program product can be implemented as part of, inserted into, or otherwise coupled to the computer system 132 of the active steering control module 126 of FIG. 1. As shown in FIG. 2, the storage device 214 can comprise a disk drive device that uses disks 215 to store data. As one exemplary implementation, the computer system 204 may also utilize an Internet website, for example for providing or maintaining data or performing operations thereon.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks (e.g., disk 215), and transmission media such as digital and analog communication links. It will similarly be appreciated that the computer system 204 may also otherwise differ from the embodiment depicted in FIG. 2, for example in that the computer system 204 may be coupled to or may otherwise utilize one or more remote computer systems and/or other control systems.

Figure 3:
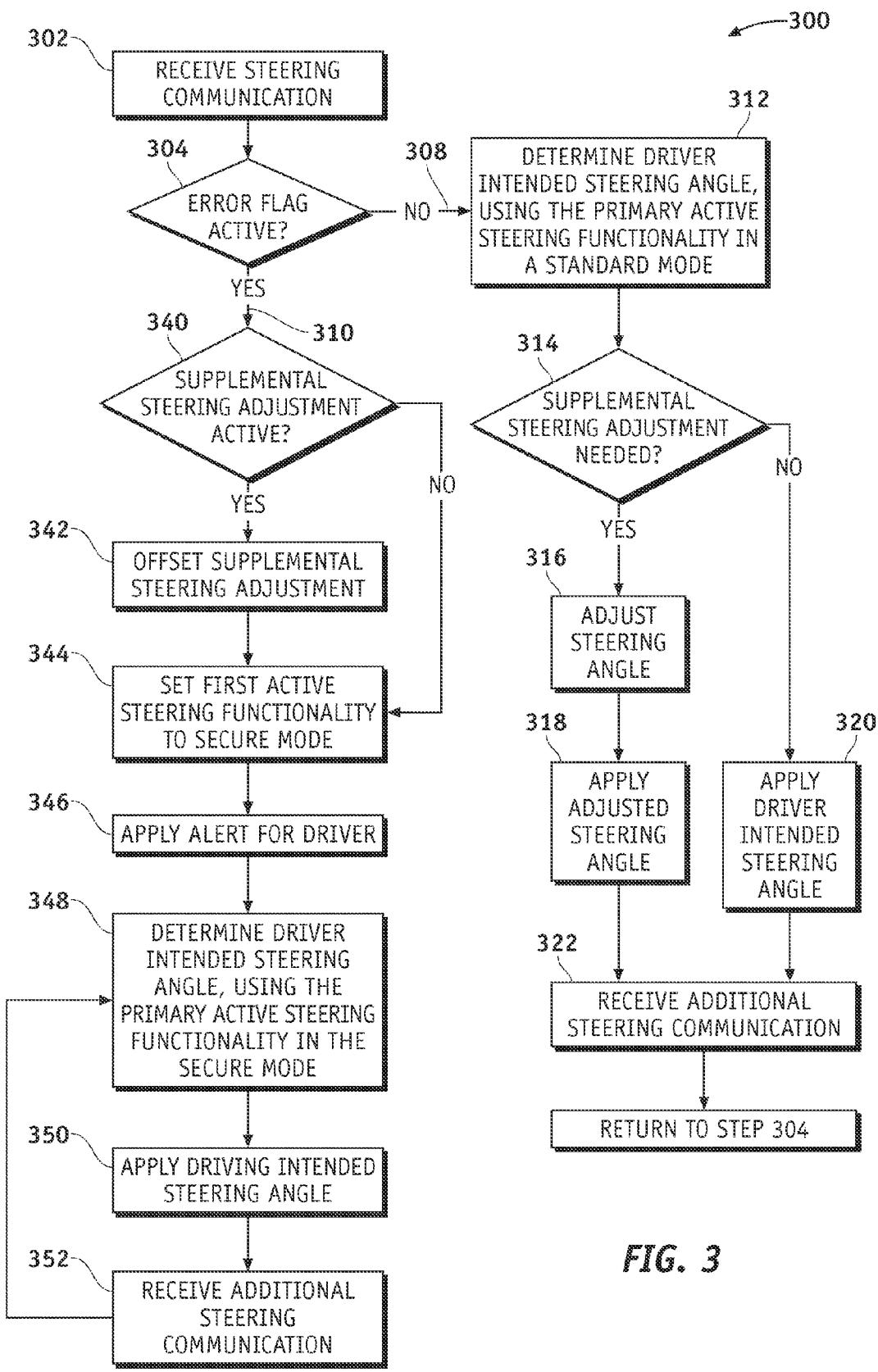
FIG. 3 is a flowchart of a process for controlling steering in a vehicle that can be used in connection with an active steering system, such as the active steering system of FIG. 1, in accordance with an exemplary embodiment of the present invention.

FIG. 3 is a flowchart of a steering control process 300 for controlling steering in a vehicle, in accordance with an exemplary embodiment of the present invention. The steering control process 300 can be used in connection with an active steering system, such as the active steering system 102 of FIG. 1, and/or in connection with a program product such as that described above in connection with the computer system 204 of FIG. 2.

As shown in FIG. 3, the steering control process 300 begins with the step of receiving a steering communication (step 302). The steering communication preferably includes one or more messages that include information relevant to calculating a driver intended steering angle of the vehicle using a primary active steering functionality, as well as information pertaining to any steering angle adjustments to be made pursuant to a supplemental active steering functionality, and an error flag used to convey information as to whether or not there are any errors associated with the supplemental active steering functionality.

In a preferred embodiment, the steering communication is generated at least in part by the supervisory control module 124, based at least in part on information obtained from the sensors 110. The steering communication is then sent by the supervisory control module 124 and received by the active steering control module 126. In one embodiment, the active steering control module 126 receives, from the supervisory control module 124, steering communications that include values for the supplemental active steering functionality and that also include data obtained by the supervisory control module 124 from the sensors 110 for use in the primary active steering functionality. In another embodiment, the active steering control module 126 receives a first set of steering communications from the supervisory control module 124 pertaining to the supplemental active steering functionality, and also receives an additional set of steering messages directly from the sensors 110 for use in the primary active steering functionality. Also in a preferred embodiment, as referenced herein in connection with FIG. 3 and elsewhere in this application, the primary active steering functionality refers to an open loop, variable gear ratio active steering functionality, and the supplemental active steering functionality refers to a closed loop, electronic stability control active steering functionality.

Next, a determination is made as to whether an error flag in the steering communication is active (step 304). For example, in one preferred embodiment, the error flag is initially set equal to zero, and is subsequently changed to a value equal to one, rendering it active, if the steering communication reflects that any one of a plurality of particular types of errors are present. The error flag may then be reset equal to zero after a current ignition cycle is complete. As defined herein, the current ignition cycle is defined as a period of time after a vehicle engine has been turned on, and lasting until the engine is turned off (thus, a new engine cycle commences every time the engine is turned on again).

As will be explained in greater detail further below in connection with FIG. 4, preferably these particular types of errors indicate that there is a potential problem with the supplemental active steering functionality but not with the primary active steering functionality. Such errors may include, for example, a steering angle adjustment value that is out-of-range or invalid, a change in steering angle adjustment that is out-of-range or invalid, an absence of a steering communication pertaining to the supplemental active steering functionality (e.g., if the only steering communication received in step 302 pertained exclusively to the primary active steering functionality), and/or another indication that the supplemental active steering functionality may be inactive and/or may not be functioning at an optimal level.

If it is determined that the error flag is not active, then the process proceeds along a first path 308. As described in greater detail below, during the first path 308, a steering angle for the vehicle is calculated using the primary active steering functionality in a standard operating mode, and also using the supplemental active steering functionality. Conversely, if it is determined that the error flag is active, then the process proceeds along a second path 310. As described in greater detail further below, during the second path 310, a steering angle for the vehicle is calculated using the primary active steering functionality in a secure operating mode, and without using the supplemental active steering functionality.

The first path 308 begins with the step of determining a driver intended steering angle using the primary active steering functionality in a standard mode of operation (step 312). Preferably, the driver intended steering angle is determined by the active steering control module 126 of FIG. 1, using information obtained from the sensors 110 either directly (e.g. from a steering communication received directly from the sensors 110) or indirectly (e.g. via a steering communication received from the supervisory control module 124). In one such preferred embodiment, the driver intended steering angle is determined by the active steering control module 126 using a standard mode look-up table that is stored in the memory 208 of FIG. 2, and using input variables such as a steering wheel angle, a steering wheel angle rate, and a speed of the vehicle.

Next, a determination is made as to whether a supplemental active steering adjustment is needed (step 314). In a preferred embodiment, such a supplemental active steering adjustment may be needed, for example, if the vehicle is in a skid, or other conditions warrant use of an electronic stability control functionality. Also in a preferred embodiment, the determination as to whether a supplemental active steering adjustment is needed is included within and/or determined from the steering communication received in step 302. For example, in one such embodiment, if a non-zero value for an active steering adjustment angle is included in the steering communication, then this indicates that a supplemental active steering adjustment is needed.

If it is determined that a supplemental active steering adjustment is needed, then the vehicle steering angle is adjusted by the supplemental active steering adjustment (step 316). Specifically, in step 316, the driver intended steering angle is adjusted by the supplemental active steering adjustment to produce an adjusted steering angle for the vehicle. For example, if it is determined in step 312 that the driver intended steering angle is positive ten degrees, and in step 314 that the supplemental active steering adjustment is positive two degrees, then the adjusted steering angle will be positive twelve degrees. Regardless of the sign and magnitude, the adjusted steering angle is then applied for the vehicle (step 318). In one embodiment, the adjusted steering angle is applied by rotating a pinion on a steering rack of the vehicle, as a result of movement by the actuator unit 114 based on instructions provided by the active steering control module 126 of FIG. 1, which results in a modified angle for the road wheels 106. In a preferred embodiment, if the driver is holding the hand wheel 104 of the vehicle from FIG. 1, then actuator unit 114 torque is reacted by the driver as the driver holds the hand wheel 104. Conversely, in this embodiment, if the hand wheel 104 of FIG. 1 is not being held, then movement of the actuator unit 114 takes a path of least resistance, resulting in the hand wheel 104 moving instead of the road wheels 106.

Conversely, if it is determined that a supplemental active steering adjustment is not needed, then the driver intended steering angle is applied for the vehicle (step 320), without any other adjustments. In one preferred embodiment, the driver intended steering angle is similarly applied by rotating a pinion on a steering rack of the vehicle, as a result of movement by the actuator unit 114 based on instructions provided by the active steering control module 126 of FIG. 1, resulting in adjustment of the road wheels 106. In a preferred embodiment, if the driver is holding the hand wheel 104 of the vehicle from FIG. 1, then actuator unit 114 torque is reacted by the driver as the driver holds the hand wheel 104. Conversely, in this embodiment, if the hand wheel 104 of FIG. 1 is not being held, then movement of the actuator unit 114 takes a path of least resistance, resulting in the hand wheel 104 moving instead of the road wheels 106.

Following the application of the adjusted steering angle (step 318) or the driver intended steering angle (step 320), the process continues along the first path 308 with the step of receiving an additional steering communication (step 322). The process then proceeds again to step 304 for a determination as to whether an error flag is active in this new, additional steering communication, and the process continues with a new iteration. The process repeats in this manner, preferably continuously, with various iterations along the first path 308 until the current ignition cycle terminates, or until a determination is made in step 304 that an error flag is active. Once the current ignition cycle terminates, the process terminates, and the error flag is cleared, or set equal to zero, in a preferred embodiment. Alternatively, if a determination is made during any iteration of step 304 that an error flag is active (i.e., if the error flag has a value of one, in a preferred embodiment) during the current ignition cycle, the process then proceeds along the second path 310.

As discussed above, if it is determined that the error flag is active, a steering angle for the vehicle is calculated using the primary active steering functionality in a secure operating mode and without using the supplemental active steering functionality. The second path 310 begins with the step of determining whether a supplemental active steering adjustment is active (step 340). For example, in one preferred embodiment, this condition is satisfied if an adjusted steering angle has been determined in a prior iteration of step 316 and applied in step 318, and if such adjusted steering angle is still currently being applied for the vehicle. If it is determined that such a supplemental active steering adjustment is active, then the supplemental active steering adjustment is offset (step 342). For example, if the hand wheel 104 currently reflects a clockwise adjustment of two degrees through the application of an adjusted steering angle in a prior iteration of step 318, then, in a preferred embodiment, the hand wheel 104 is then adjusted counterclockwise by two degrees in step 342. In a preferred embodiment, such adjustments are made by the actuator unit 114 in accordance with instructions provided by the active steering control module 126 of FIG. 1.

In addition, as the second path 310 continues, the first active steering functionality is set to a secure mode (step 344). For example, in one preferred embodiment, such a secure mode represents the use of a different look-up table (as compared with that used in connection with the standard mode described above) relating the input variables to desired steering angles. Also in a preferred embodiment, steering in the secure mode offers less sensitive steering than in the standard mode because the backup functionality provided by the supplemental active steering functionality is unavailable.

An alert is preferably provided to the driver (step 346) when the primary active steering functionality operates in the secure mode. The alert may be audio or visual, or both, in form. For example, in one preferred embodiment, the alert module 115 of FIG. 1 provides a chime sound along with a visual notice on a vehicle screen display indicating that the primary active steering functionality is being utilized in the secure mode. This is used in case the driver wishes to change any driving actions based on the fact that the vehicle is now in the secure mode, and to make the driver aware that active front steer capability of the vehicle has been altered or changed in secure mode.

Next, the driver intended steering angle is determined, using the primary active steering functionality in the secure mode of operation (step 348). Preferably, the driver intended steering angle is determined by the active steering control module 126 of FIG. 1 using information obtained from the sensors 110. In one such preferred embodiment, the driver intended steering angle is determined by the active steering control module 126 using a secure mode look-up table stored in the memory 208 of FIG. 2, and using input variables such as a steering wheel angle, a steering wheel angle rate, and a speed of the vehicle.

The driver intended steering angle is then applied for the vehicle (step 350). In one preferred embodiment, the driver intended steering angle is applied by rotation of the hand wheel 104 or the road wheel 106, or both, as a result of movement by the actuator unit 114 based on instructions provided by the active steering control module 126 of FIG. 1.

Following the application of the driver intended steering angle (step 350), the process continues along the second path 310 with the step of receiving an additional steering communication (step 352). The process then proceeds again to step 348, and a new driver intended steering angle is determined, based on the additional steering communication. The new driver intended steering angle is then applied for the vehicle (step 350). Steps 348-352 then repeat in this manner through various iterations of this portion of the second path 310, preferably continuously, until the current ignition cycle terminates. As described above, once the current ignition cycle terminates, the process terminates, and the error flag is cleared, or set equal to zero, in a preferred embodiment. Also, it will be appreciated that certain steps of the steering control process 300 may vary, and/or may be performed simultaneously or in a different order than that depicted in FIG. 3 and/or described above in connection therewith.

Figure 4:
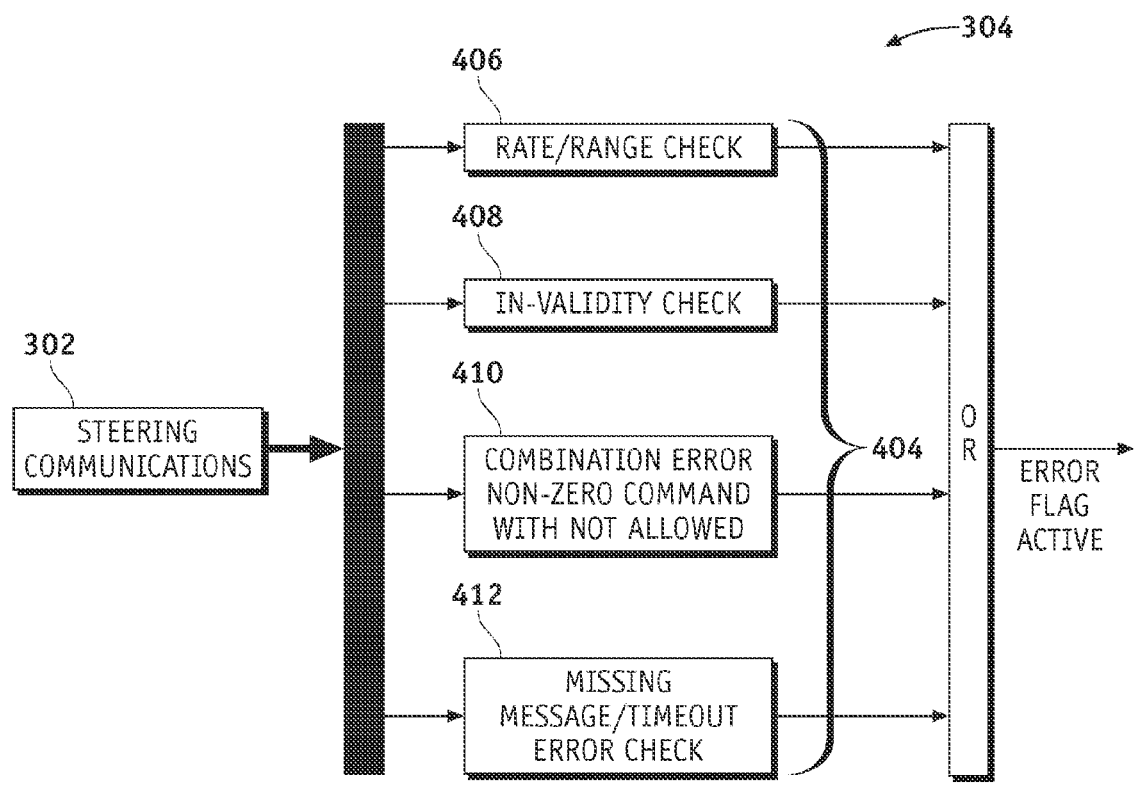
FIG. 4 is a logic diagram of a step from the steering control process of FIG. 3, namely a step of determining whether an error flag is active, in accordance with an exemplary embodiment of the present invention.

FIG. 4 is a logic diagram of a step from the steering control process 300 of FIG. 3, namely the step of determining whether an error flag is active (step 304), in accordance with an exemplary embodiment of the present invention. In the depicted embodiment, one or more steering communications 302, such as one of the steering communications received in steps 302, 322, or 352 of the steering control process 300 of FIG. 3, is examined to determine whether it reflects one or more of a plurality of predetermined types of errors 404.

Preferably at least some of the steering communications 302 are generated by the supervisory control module 124, and are transmitted to the active steering control module 126 of FIG. 1. In another embodiment, certain steering communications 302 are also generated by the sensors 110 of FIG. 1, and are transmitted from the sensors 110 directly to the active steering control module 126. For example, in one embodiment, the supervisory control module 124 generates steering communications 302 that are relevant to both the primary and supplemental active steering functionalities, and transmits these steering communications 302 to the active steering control module 126. In another embodiment, the supervisory control module 124 generates steering communications 302 that are relevant to the supplemental active steering functionality and transmits them to the active steering control module 126, and the sensors 110 (or other vehicle modules) generate additional steering communications 302 that are relevant to the primary active steering functionality and transmit them to the active steering control module 126.

Preferably each of these particular types of errors 404 indicates that there is a potential problem with the supplemental active steering functionality. The errors may include, for example, a first error type 406 that occurs when a steering angle adjustment value, or a rate of change of steering angle adjustment values, is outside of a predetermined range of values. A second error type 408 may occur when a steering angle adjustment value represents a value that is not among a recognized group of valid values. A third error type 410 may occur when the steering communication 302 provides a non-zero steering angle adjustment value, but also indicates that such a non-zero steering angle is inappropriate, for example if conditions do not warrant use of the supplemental active steering functionality.

A fourth error type 412 occurs when a particular type of steering communication 302 is not received within a predetermined amount of time. In certain embodiments, the fourth error type 412 indicates that a steering communication 302 pertaining to the supplemental active steering functionality has not been received within a predetermined amount of time. For example, in one such embodiment, this may indicate that the active steering control module 126 of FIG. 1 has received a steering communication 302 from the sensors 110 pertaining to the primary active steering functionality, but has not received a steering communication from the supervisory control module 124 pertaining to the supplemental active steering functionality.

If one of or more of the plurality of predetermined types of errors 404 are present, then the error flag is set to an active value (i.e., the error flag is set equal to one, in a preferred embodiment). Alternatively, if none of the plurality of predetermined types of errors 404 are present, then the error flag remains inactive (i.e., the error flag remains at a pre-set value equal to zero, in a preferred embodiment). In various other embodiments, any number of different types of errors 404 may be utilized, instead of or in addition to those depicted in FIG. 4 and described above.

Accordingly, an active steering system 102 and a steering control process 300 are provided, along with a computer system 204 and a program 212 for implementing the steering control process 300. The active steering system 102, the steering control method 300, the computer system 204, and the program 212 provide improved systems, methods, and/or devices for controlling steering in a vehicle by bypassing a supplemental active steering functionality without bypassing a primary active steering functionality in appropriate circumstances, and thus for improving performance and driving experience for the vehicle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:
1. A method for controlling steering in a vehicle, the method comprising the steps of:
   obtaining a vehicle steering communication;
   controlling an actuator coupled to a hand wheel, a road wheel, or both, using a primary active steering functionality that controls steering based on a driver's intended steering angle, if the vehicle steering communication reflects one or more of a plurality of types of specified errors; and controlling the actuator at least in part using the primary active steering functionality and a supplemental active steering functionality that controls steering based on a calculated adjustment to the driver's intended steering angle, to thereby control steering different from the driver's intended steering angle, if the vehicle steering communication does not reflect one or more of the plurality of types of specified errors.

2. The method of claim 1, wherein the primary active steering functionality is operated in:
a first mode, if the vehicle steering communication does not reflect one or more of the plurality of types of specified errors; and
a second mode, if the vehicle steering communication reflects one or more of the plurality of types of specified errors, wherein the second mode comprises a secure mode with less sensitive steering than the first mode.

3. The method of claim 1, wherein:
the primary active steering functionality determines the driver's intended steering angle; and
the supplemental active steering functionality calculates the adjustment to the driver's intended steering angle.

4. The method of claim 1, wherein the driver's intended steering angle is determined at least in part as a function of the following variables: a steering wheel angle, a steering wheel angle rate, a speed of the vehicle, or any combination thereof.

5. The method of claim 3, wherein the supplemental active steering functionality comprises an electronic stability control functionality, and the method further comprises the step of:
adjusting the driver's intended steering angle by the adjustment, if both of the following conditions are satisfied:
the vehicle steering communication indicates that stability control is needed; and
the vehicle steering communication does not reflect one or more of the plurality of types of specified errors.

6. The method of claim 2, further comprising the step of:
providing a visual alert, an audio alert, or both when the primary active steering functionality is operated in the secure mode.

7. The method of claim 5, further comprising the steps of:
obtaining an additional vehicle steering communication; and
resetting the driver's intended steering angle to offset the adjustment, if the following condition is satisfied:
after the driver's intended steering angle is adjusted, the additional vehicle steering communication reflects one or more of the plurality of types of specified errors.

8. A program product for controlling steering in a vehicle, comprising:
a program configured to at least facilitate:
obtaining a vehicle steering communication;
controlling an actuator coupled to a hand wheel, a road wheel, or both, using a primary active steering functionality that controls steering based on a driver's intended steering angle, if the vehicle steering communication reflects one or more of a plurality of types of specified errors; and
controlling the actuator using the primary active steering functionality and a supplemental active steering functionality that controls steering based on a calculated adjustment to the driver's intended steering angle, to thereby control steering different from the driver's intended steering angle, if the vehicle steering communication does not reflect one or more of the plurality of types of specified errors; and
a computer-readable signal bearing media bearing the program.

9. The program product of claim 8, wherein the program is configured to operate the primary active steering functionality in:
a first mode, if the vehicle steering communication does not reflect one or more of the plurality of types of specified errors; and
a second mode, if the vehicle steering communication reflects one or more of the plurality of types of specified errors, wherein the second mode comprises a secure mode with less sensitive steering than the first mode.

10. The program product of claim 8, wherein:
the primary active steering functionality determines the driver's intended steering angle; and
the supplemental active steering functionality calculates the adjustment to the driver's intended steering angle.

11. The program product of claim 10, wherein the supplemental active steering functionality comprises an electronic stability control functionality, and the program is further configured to at least facilitate:
adjusting the driver's intended steering angle by the adjustment, if both of the following conditions are satisfied:
the vehicle steering communication indicates that stability control is needed; and
the vehicle steering communication does not reflect one or more of the plurality of types of specified errors.

12. The program product of claim 11, wherein the program is further configured to at least facilitate:
obtaining an additional vehicle steering communication; and
resetting the driver's intended steering angle to offset the adjustment, if the following condition is satisfied:
after the driver's intended steering angle is adjusted, the additional vehicle steering communication reflects one or more of the plurality of types of specified errors.

13. An active steering system for a vehicle, the active steering system comprising:
a supervisory control module; and
an active steering control module coupled to the supervisory control module and configured to receive a vehicle steering communication therefrom, the active steering control module further configured to at least facilitate:
controlling a hand wheel, a road wheel, or both, using a primary active steering functionality that controls steering based on a driver's intended steering angle, if the vehicle steering communication reflects one or more of a plurality of types of specified errors; and
controlling the hand wheel, the road wheel, or both, using the primary active steering functionality and a supplemental active steering functionality that controls steering based on a calculated adjustment to the driver's intended steering angle, to thereby control steering different from the driver's intended steering angle, if the vehicle steering communication does not reflect one or more of the plurality of types of specified errors.

14. The active steering system of claim 13, wherein the active steering control module is configured to operate the primary active steering functionality in:
a first mode, if the vehicle steering communication does not reflect one or more of the plurality of types of specified errors; and
a second mode, if the vehicle steering communication reflects one or more of the plurality of types of specified error, wherein the second mode comprises a secure mode with less sensitive steering than the first mode.

15. The active steering system of claim 13, wherein:
the primary active steering functionality determines the driver's intended steering angle; and
the supplemental active steering functionality calculates the adjustment to the driver's intended steering angle.

16. The active steering system of claim 15, wherein the supplemental active steering functionality comprises an electronic stability control functionality, and the active steering control module is further configured to at least facilitate:
adjusting the driver's intended steering angle by the adjustment, if both of the following conditions are satisfied:
the vehicle steering communication indicates that stability control is needed; and
the vehicle steering communication does not reflect one or more of the plurality of types of specified errors.

17. The active steering system of claim 13, further comprising:
a sensor coupled to the supervisory control module and configured to supply information thereto for use in the vehicle steering communication.

18. The active steering system of claim 13, wherein the active steering system further comprises:
an actuator unit coupled to the active steering control module;
wherein the supervisory control module is configured to control the hand wheel, the road wheel, or both at least in part via movement of the actuator unit.

19. The active steering system of claim 14, further comprising:
an alert module coupled to the active steering control module and configured to provide a visual alert, an audio alert, or both based on an instruction from the active steering control module when the primary active steering functionality is used in connection with the secure mode.

20. The active steering system of claim 16, wherein the active steering control module is further configured to at least facilitate:
obtaining an additional vehicle steering communication; and
resetting the driver's intended steering angle to offset the adjustment, if the following condition is satisfied:
after the driver's intended steering angle is adjusted, the additional vehicle steering communication reflects one or more of the plurality of types of specified errors.

* * * * *